United States Patent
Kang et al.

(10) Patent No.: US 10,409,486 B2
(45) Date of Patent: Sep. 10, 2019

(54) ELECTRONIC DEVICE WITH MULTI-PORTION DISPLAY AND CONTROL METHOD THEREOF

(71) Applicant: Samsung Electronics Co., Ltd., Gyeonggi-do (KR)

(72) Inventors: Byungjin Kang, Seoul (KR); Namhoi Kim, Gyeonggi-do (KR); Seongwoong Park, Seoul (KR); Do-Hyung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 196 days.

(21) Appl. No.: 15/168,372

(22) Filed: May 31, 2016

(65) Prior Publication Data
US 2016/0357434 A1    Dec. 8, 2016

(30) Foreign Application Priority Data
Jun. 2, 2015    (KR) .................. 10-2015-0078015

(51) Int. Cl.
*G06F 3/0488*  (2013.01)
*G06F 3/041*   (2006.01)
*G06F 1/16*    (2006.01)

(52) U.S. Cl.
CPC ........ *G06F 3/04886* (2013.01); *G06F 1/1626* (2013.01); *G06F 3/0414* (2013.01); *G06F 2203/04104* (2013.01); *G06F 2203/04803* (2013.01)

(58) Field of Classification Search
CPC .. G06F 1/1626; G06F 3/04886; G06F 3/0414; G06F 2203/04803; G06F 2203/04104
See application file for complete search history.

(56) References Cited

U.S. PATENT DOCUMENTS

| | | | |
|---|---|---|---|
| 8,736,162 B2 | 5/2014 | Jin et al. | |
| 2004/0263686 A1* | 12/2004 | Kim | H04N 5/44591 348/556 |
| 2012/0023459 A1 | 1/2012 | Westerman | |
| 2012/0038571 A1* | 2/2012 | Susani | G06F 3/0416 345/173 |
| 2012/0242684 A1 | 9/2012 | Kim | |
| 2012/0274600 A1* | 11/2012 | Yeung | G06F 3/03547 345/174 |
| 2013/0033434 A1 | 2/2013 | Richardson et al. | |
| 2013/0038564 A1 | 2/2013 | Ho | |
| 2013/0082978 A1 | 4/2013 | Horvitz et al. | |

(Continued)

FOREIGN PATENT DOCUMENTS

| | | |
|---|---|---|
| KR | 10-2014-0092059 A | 7/2014 |
| KR | 10-2014-0106285 A | 9/2014 |

OTHER PUBLICATIONS

European Search Report dated Oct. 11, 2016.
(Continued)

*Primary Examiner* — Kwang-Su Yang
(74) *Attorney, Agent, or Firm* — Cha & Reiter, LLC

(57) ABSTRACT

A method for controlling a display of an electronic device, comprising: detecting a first input; and dividing the display of the electronic device into at least a main screen area, a left-edge area, and a right-edge area based on the first input.

16 Claims, 10 Drawing Sheets

(56) References Cited

U.S. PATENT DOCUMENTS

| | | | |
|---|---|---|---|
| 2013/0111384 A1 | 5/2013 | Kim et al. | |
| 2014/0053097 A1* | 2/2014 | Shin | G06F 9/4443 715/779 |
| 2014/0125612 A1* | 5/2014 | Park | G06F 3/0416 345/173 |
| 2014/0198036 A1 | 7/2014 | Kim et al. | |
| 2014/0289655 A1 | 9/2014 | Park et al. | |
| 2015/0095826 A1* | 4/2015 | Ahn | G06F 3/0488 715/769 |
| 2016/0179338 A1* | 6/2016 | Miller | G06F 3/04817 345/174 |
| 2017/0097715 A1* | 4/2017 | Kim | H04M 1/0266 |

OTHER PUBLICATIONS

European Search Report dated Oct. 16, 2017.
European Search Report dated Jun. 26, 2018.
European Result of Consultation dated Jan. 8, 2019.
European Minutes dated Feb. 15, 2019.
European Intent to Grant dated Feb. 21, 2019.

\* cited by examiner

ELECTRONIC DEVICE WITH MULTI-PORTION DISPLAY AND CONTROL METHOD THEREOF

CLAIM OF PRIORITY

The present application claims the benefit under 35 U.S.C. § 119(a) to a Korean patent application filed in the Korean Intellectual Property Office on Jun. 2, 2015, and assigned Serial No. 10-2015-0078015, the entire disclosure of which is hereby incorporated by reference.

TECHNICAL FIELD

The present disclosure relates generally to electronic devices, in general, and more particularly to a method for controlling a display of an electronic device, and the electronic device thereof.

BACKGROUND

Various electronic devices such as a smartphone or a tablet Personal Computer (PC) are widely used, and such an electronic device can include a Touch Screen Panel (TSP). A user of the electronic device can execute his/her intended operation by touching the TSP with a hand or hovering over the TSP within a short distance.

FIG. 1 depicts an electronic device 100 including an edge screen. Referring to FIG. 1, the electronic device 100 can include a smart phone. A main screen 101 can be displayed at the center of the electronic device 100, and an edge screen 102 can be displayed on one side (e.g., a right side) of the electronic device 100. The edge screen 102 can be referred to as various names, such as a subscreen which serves as an auxiliary screen of the main screen 101.

When the screen 102 is displayed on the right of the main screen 101, the user can grab the electronic device 100 with a right hand and easily touch the edge screen 102 using a thumb of the right hand.

However, the user holding the electronic device 100 with a left hand cannot touch the edge screen 102 displayed on the right using a thumb of the left hand. In this regard, what is needed is an efficient method for allowing the user to easily use both of the left hand and the right hand.

SUMMARY

According to aspects of the disclosure, a method is provided for controlling a display of an electronic device, comprising: detecting a first input; and dividing the display of the electronic device into at least a main screen area, a left-edge area, and a right-edge area based on the first input.

According to aspects of the disclosure, an electronic device is provided comprising: a display; a memory; and at least one processor operatively coupled to the memory, configured to: detect a first input; and divide the display into at least a main screen area, a left-edge area, and a right-edge area based on the first input.

According to aspects of the disclosure, a non-transitory computer-readable storage medium is provided that stores one or more processor-executable instructions which when executed by at least one processor cause the at least one processor to perform a method comprising the steps of: detecting a first input; and dividing a display into at least a main screen area, a left-edge area, and a right-edge area based on the first input.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
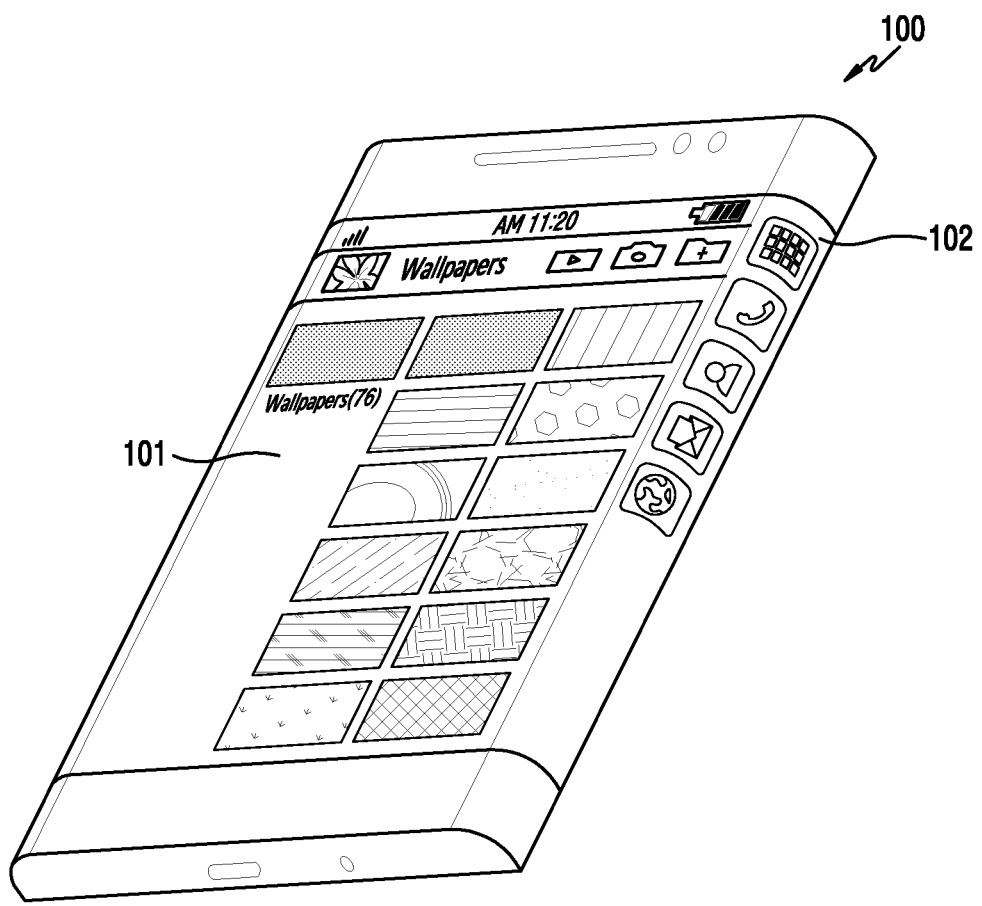
FIG. 1 is a diagram of an example of an electronic device in the prior art.
Figure 2:
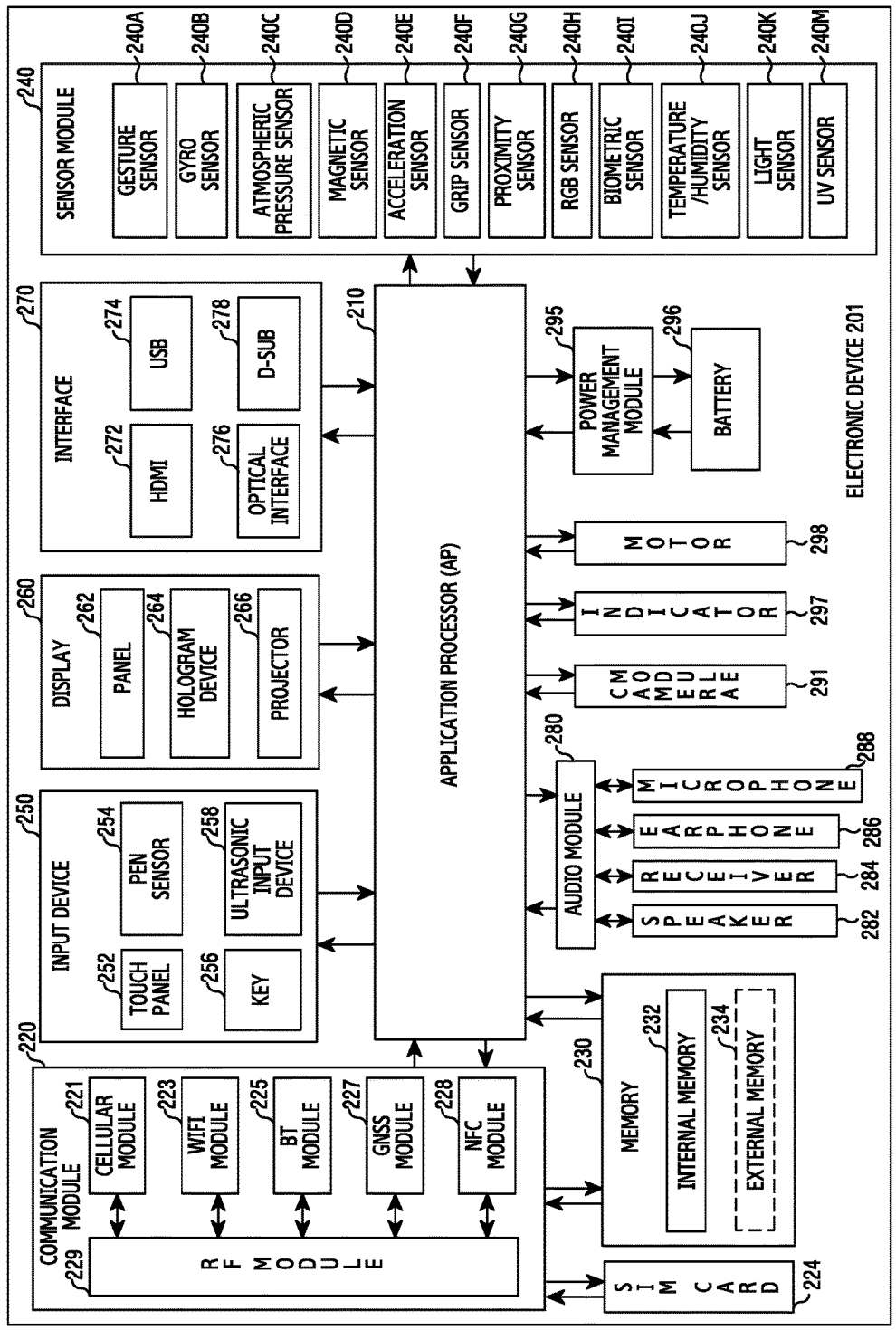
FIG. 2 is a diagram of an example of an electronic device, according to an embodiment of the present disclosure.

FIG. 2 is a block diagram 200 illustrating an example of an electronic device 201, according to various embodiments of the present disclosure. The electronic device 201 may configure, for example, all or a portion of the electronic device 21 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 220 may include one or more of a Central Processing Unit (CPU), an Application Processor (AP), and a Communication Processor (CP). In some implementations, the AP 210 may drive an OS or an application to control a plurality of hardware or software elements connected to the AP 210, and perform various data processes including multimedia data and operations. Additionally or alternatively, the AP 210 may be implemented, for example, as a system on chip (SoC). Additionally or alternatively, the AP 210 may further include at least one of a graphic processing unit (GPU) or image signal processor. According to an embodiment, the AP 210 may be implemented to include at least a portion (e.g., the cellular module 221) of the above-described elements. Also, the AP 210 may store data received from at least one of other elements or generated by at least one of other elements in a non-volatile memory.

The communication module 220 (e.g., the communication interface 160) may perform data transmission/reception in communication between the electronic device 201 (e.g., the electronic device 21) and other electronic devices (e.g., the electronic device 24 or the server 26) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identity information (e.g., integrated circuit card identifier (ICCID)) or subscriber information (e.g., international mobile subscriber identity (IMSI)).

The memory 230 may include any suitable type of volatile or non-volatile memory, such as Random-access Memory (RAM), Read-Only Memory (ROM), Network Accessible Storage (NAS), cloud storage, a Solid State Drive (SSD), etc. For example, the memory 230 (e.g., the memory 20) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected to the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultraviolet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage the power supply of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent the introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a Media Flow™, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
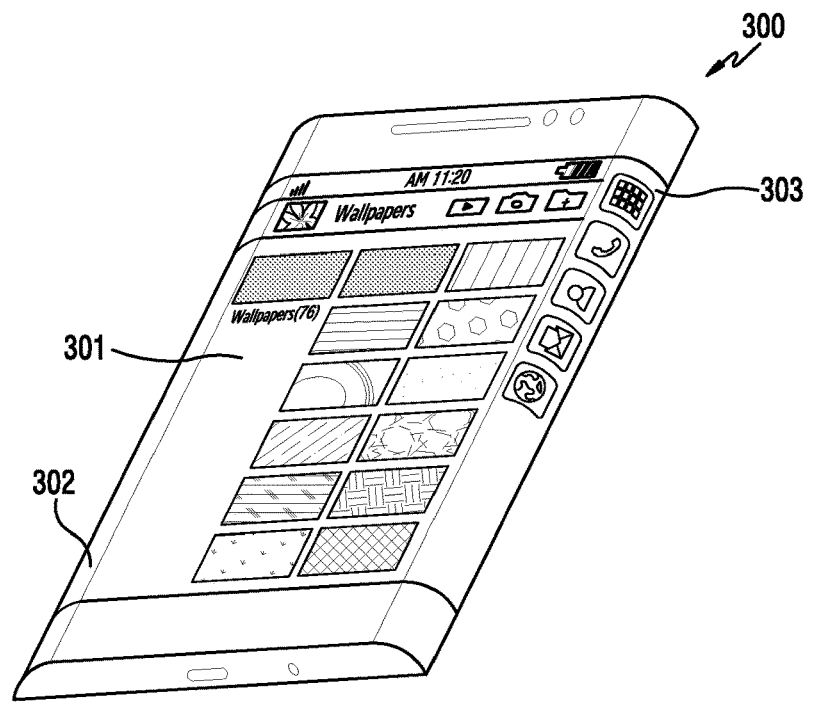
FIG. 3 is a diagram illustrating the operation of an electronic device, according to an embodiment of the present disclosure.
Figure 3:
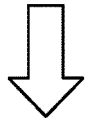
Figure 3:
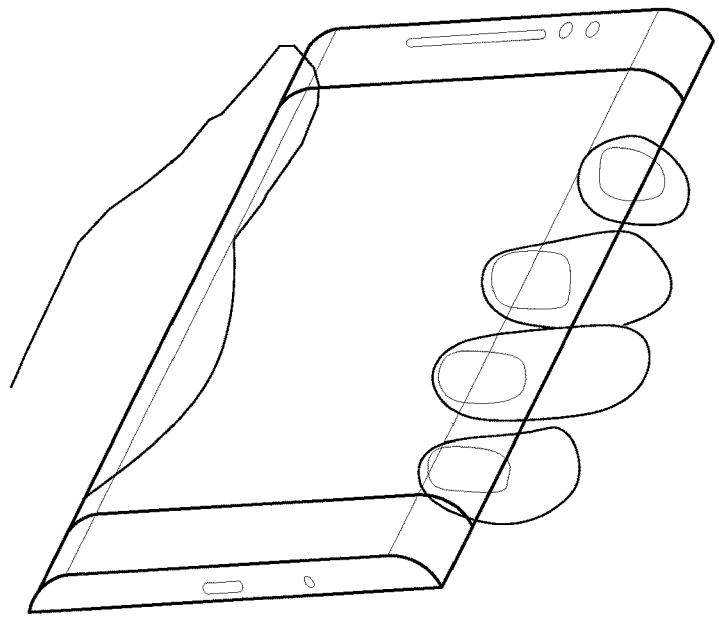
Figure 4:
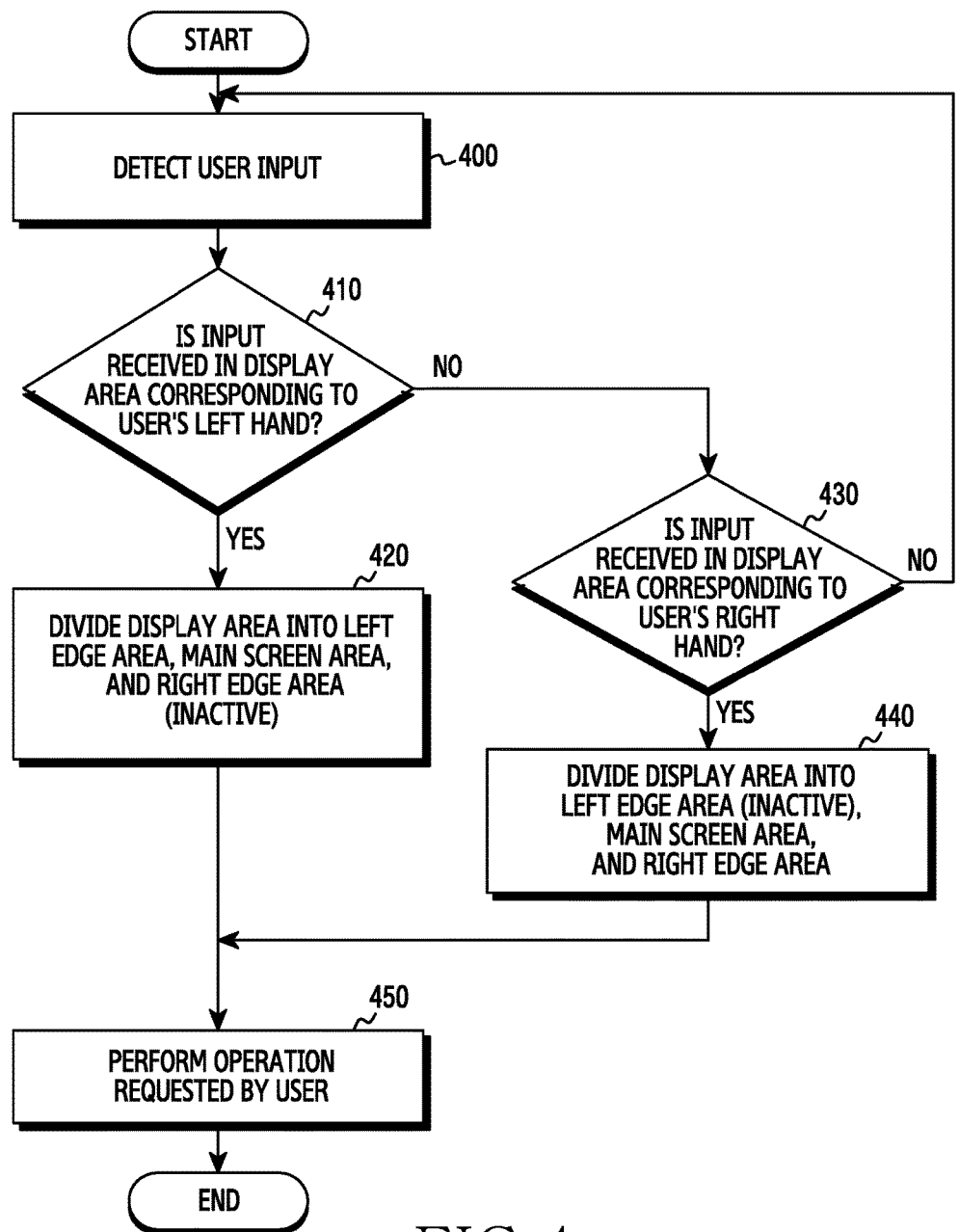
FIG. 4 is a flowchart of an example of a process, according to an embodiment of the present disclosure.

FIG. 3 is a diagram illustrating the operation of an electronic device 300, according to an embodiment of the present disclosure. FIG. 4 is a flowchart of an example of a process performed by the electronic device 300, according to an embodiment of the present disclosure.

Referring to FIG. 3, the electronic device 300 can include any suitable type of electronic device, such as a smartphone for example. A display of the electronic device 300 can be divided to display a main screen area 301 for displaying a main screen at the center, and a left edge screen area 302 and a right edge screen area 303 for outputting an edge screen. Portions corresponding to the left edge screen area 302 and the right edge screen area 303 in the display can be curved or inclined at a certain angle as shown in FIG. 3. Alternatively, part of the edge area of the display can be allocated the edge screen area to serve as the edge screen.

The left edge screen area 302 and the right edge screen area 303 can be separated from the main screen area 301 in hardware or software. At least one of the left edge screen area 302 and the right edge screen area 303 can be designated as an inactive area. According to aspects of the disclosure, designating a given screen area as an inactive area may include deactivating the given area (e.g., turning off or otherwise disabling the area), such that when input is received in the given screen area, the input is ignored and no action is taken by the electronic device in response. Additionally or alternatively, designating a given screen area as an inactive area, may include displaying an indication in the given screen area that the given screen area is inactive. For example, the given screen area can be colored gray, as shown in FIGS. 5-9.

Referring to FIG. 4, in operation 400, the application processor 210 of FIG. 2 (hereafter, referred to as a processor) of the electronic device 300 can detect a user input. For example, and without limitation, the user input may be provided as a result of the user holding the electronic device in his or her palm. For example, when the user grabs the electronic device with the user's left hand, the electronic device may detect that the user's palm has come in contact with the left side of the electronic device. As another example, when the user grabs the electronic device with the user's right hand, the electronic device may detect that the user's palm has come in contact with the right side of the electronic device.

For example, a first user input area can correspond to a user's left hand, and a second user input area can correspond to a user's right hand. The processor 210 can determine whether the input is detected in the first user input area or the second user input area, according to a pressure location detected in real-time by a plurality of pressure sensors of the electronic device 300 (or by using any other suitable technique).

For example, in the first user input area, a touch area detected in the left edge screen area can be equal to or greater than a touch area detected in the right edge screen area. The processor 210 can detect the pressure location through the plurality of the pressure sensors located near the left and right edge screen areas, and determine that the user input is performed with the user's left hand when the pressure sensors at the left top and bottom of the electronic device 300 detect multiple pressures and the pressure sensor at the right top or bottom detects only one pressure.

The processor 210 can determine the area based on a touch location or a hovering touch location detected by the touch screen panel 252. For example, when the user holds the electronic device 300, the processor 210 can determine whether input is received in the first user input area or the second user input area. When determining whether the input is received in the first user input area or the second user input area, the processor 210 may cause touch screen panel 252 to temporarily increase its touch sensitivity and/or to make the touch sensitivity of its side line (e.g., one or more of its side portions) higher than that of the center portion in hardware.

When the processor 210 determines that the user input is detected in the first user input area corresponding to the user's left hand in operation 410, the processor 210 can control the display 260 to divide the display area into at least three areas in operation 420. The three areas can include the left edge screen area, the main screen area, and the right edge screen area. The right edge screen area can be defined as the inactive area.

When the processor 210 determines that the user input is detected in the second user input area corresponding to the user's right hand in operation 430, the processor 210 can control the display 260 to divide the display area into at least three areas, assign the three areas the left edge screen area, the main screen area, and the right edge screen area, and designate the left edge screen area as the inactive area in operation 440.

In operation 450, the processor 210 can execute a corresponding operation as requested by the user through the left edge screen area or the right edge screen area and the main screen area.

When displaying an application execution screen requested by the user through the main screen area, the processor 210 can designate the left and right edge screen areas on the sides of the main screen area, as the inactive area. When displaying the application execution screen requested by the user through the main screen area, designating the left and right edge screen areas on the sides of the main screen area as the inactive area, and receiving an edge screen invoke request from the user, the processor 210 can display the edge screen in at least one of the left and right edge screen areas.

When displaying the application execution screen requested by the user through the main screen area and displaying a home screen in the main screen area according to a user request, the processor 210 can re-divide the display based on which hand the user is holding the electronic device 300 with.

The processor 210 can re-divide the display area when a particular preset key is input or a particular gesture is detected. For example, the processor 210 can re-divide the display area based on a detected swipe direction of a living body sensor (e.g., a heart rate monitor (HRM) sensor), the user holds the electronic device 300 with both hands, tilts the electronic device 300 sideways and flips, or uses a home screen fingerprint sensor. Re-dividing the display area may include activating an area that is currently inactive and/or deactivating an area that is currently active. When a given area is activated, the processor 210 may increase the size of the given area. Additionally or alternatively, when the given area is activated, the processor may display a menu (and/or any other suitable type of user interface or user interface component) in the given area and begin responding to input that is received in that area. Additionally or alternatively, as discussed above, when another area is deactivated the processor may decrease the size of the other area in order to compensate for any increase in the size of the given area.

The processor 210 can associate and variously display contents and/or change the contents displayed in the edge screen area according to an angle, a direction, and a speed at which the user intentionally tilts the electronic device 300.

According to the pressure of the user holding the electronic device 300 with both hands, the processor 210 can associate and variously display the contents and the changing speed of the information in the edge screen area. Further, the electronic device 300 can include a high-resolution haptic sensor and variously generate haptic feedback in association with the information displayed in the edge screen area.

For example, every time the user holding the electronic device 300 with both hands tilts the electronic device 300 to one side, the processor 210 can change the content (e.g., menu) displayed in the edge screen area and a and/or provide haptic feedback.

When the user grabs both sides of the electronic device 300 twice and lifts the electronic device 300 up, the processor 210 can display a particular panel (e.g., emergency contact) in the edge screen area. Further, when the user puts his/her finger on a rear HRM sensor of the electronic device 300 and snaps the electronic device 300 from side to side, the processor 210 can display another panel, for example a health panel, in the edge screen area (e.g., left-edge area or right-edge area).

Figure 5:
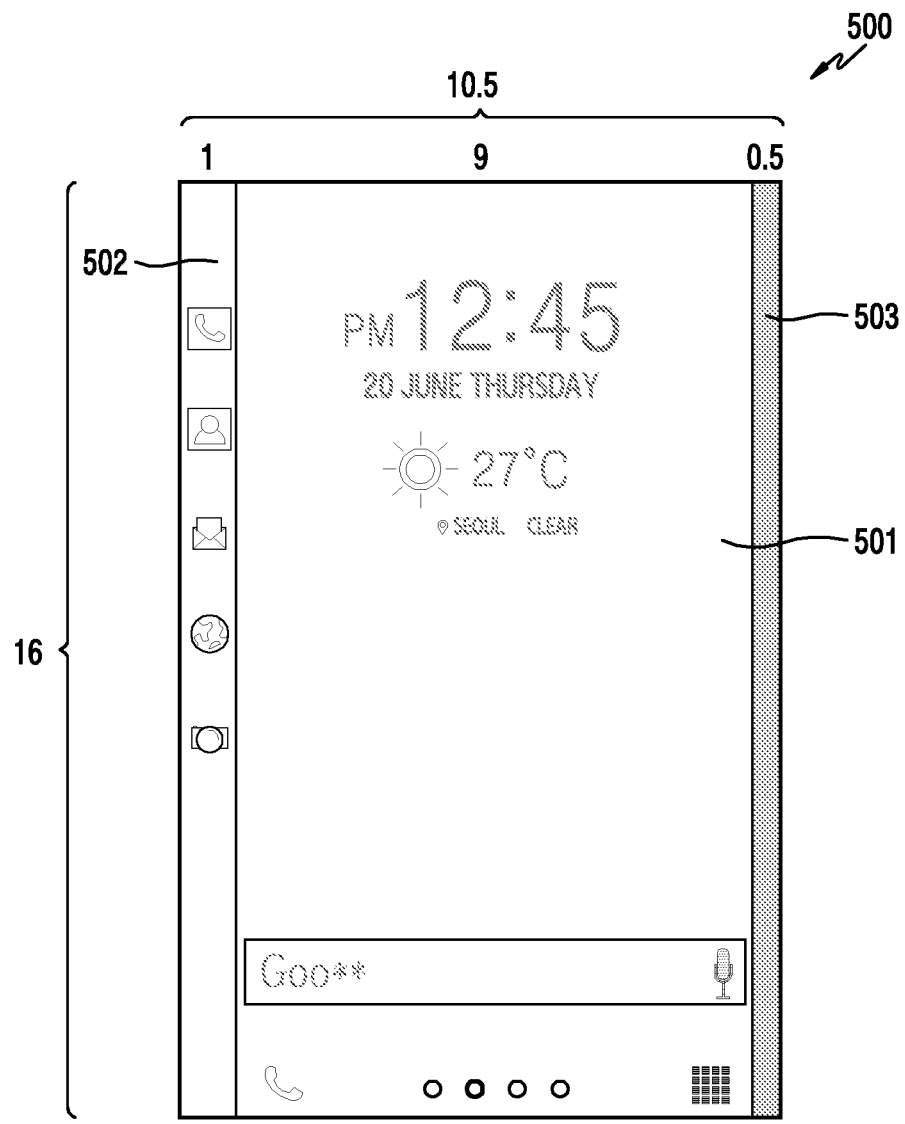
FIG. 5 is a diagram of an example of a user interface, according to an embodiment of the present disclosure.

FIG. 5 is a diagram of an example of a user interface, according to an embodiment of the present disclosure. More particularly, FIG. 5 depicts an edge screen displayed in a left edge screen area of an electronic device 500 according to an embodiment of the present disclosure. FIG. 5 depicts an edge screen displayed in a right edge screen area of an electronic device 600 according to an embodiment of the present disclosure.

Referring to FIG. 5, when a user grabs the electronic device 500 with the user's left hand, the processor 210 of the electronic device 500 can determine that user input is detected in a display area corresponding to the left hand and then divide the display area into at least a first area, a second area, and a third area from the left. The first area can be set to a left edge screen area 502, the second area can be set to a main screen area 501, and the third area can be set to a right edge screen area 503, such that the size of the first area is greater than the size of the third area and smaller than the size of the second area (e.g., size of the third area<size of the first area<size of the second area).

According to the example of FIG. 5, the right edge screen area 503 can be designated as the inactive area (e.g., deactivated) and the left edge screen area 502 may be designated as an active area (e.g., activated). When the left edge screen area 502 is designated as an active area, the processor 201 may display a user interface or a user interface component in the left edge screen area 502, as shown.

For example, as shown in FIG. 5, the left edge screen area 502 being the first area, the main screen area 501 being the second area, the right edge screen area 503 being the third area can have a size ratio of 1:9:0.5.

Figure 6:
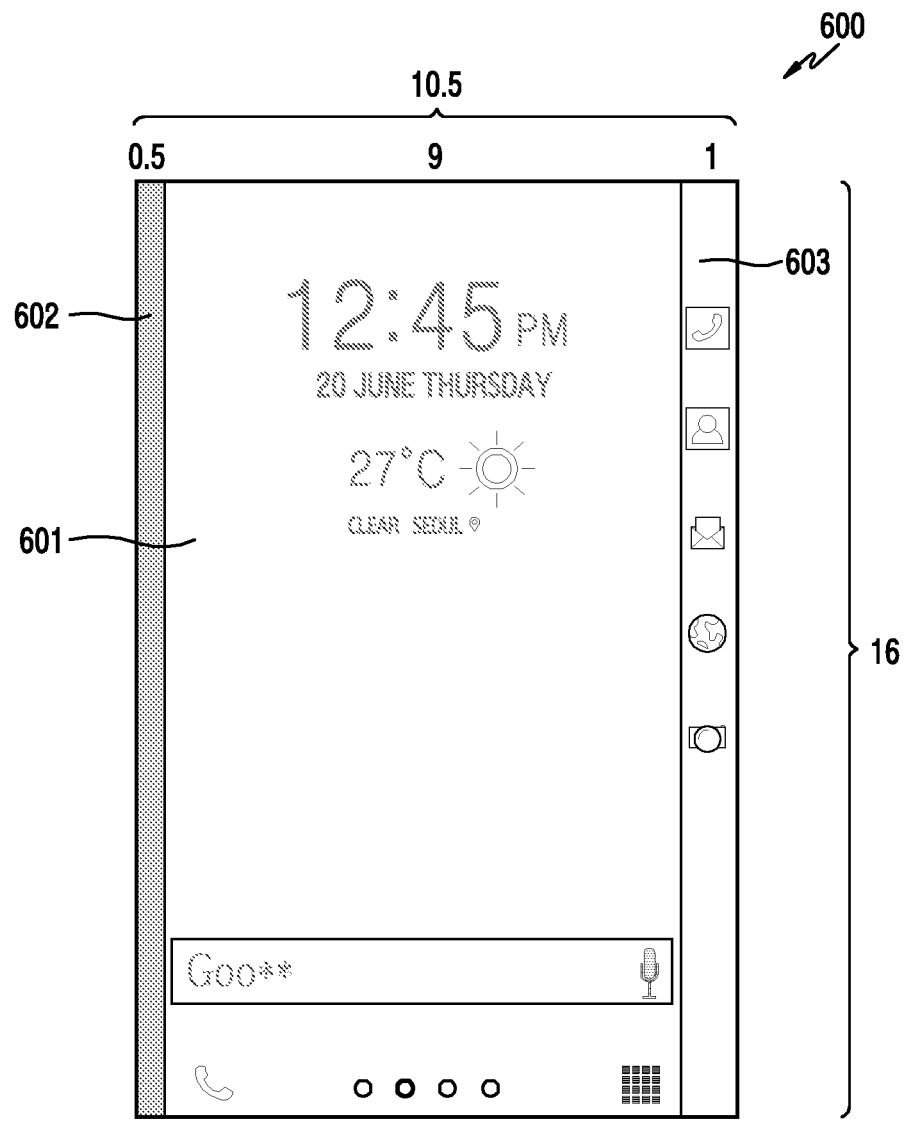
FIG. 6 is a diagram of an example of a user interface, according to an embodiment of the present disclosure.

FIG. 6 is a diagram of an example of a user interface, according to an embodiment of the present disclosure. As illustrated in FIG. 6, when a user grabs the electronic device 600 with the user's right hand, the processor 210 of the electronic device 600 can determine that user input is detected in a display area corresponding to the right hand and then divide the display area into a first area, a second area, and a third area from the left. The first area can be set to a left edge screen area 602, the second area can be set to a main screen area 601. The size of the first area may be greater than the size of the second area and smaller than the size of the third area (e.g., size of the second area<size of the first area<size of the third area).

According to the example of FIG. 6, the left edge screen area 602 can be designated as the inactive area (e.g., deactivated) and the right edge screen area 602 may be designated as an active area (e.g., activated). When the right edge screen area 602 is designated as an active area (e.g., activated), the processor 201 may display a user interface or a user interface component in the right edge screen area 602, as shown.

For example, as shown in FIG. 6, the inactive screen area 602 being the first area, the main screen area 601 being the second area, the right edge screen area 603 being the third area can have a size ratio of 0.5:9:1. The electronic device 600 is not limited to the corresponding ratio but can provide various ratios according to a situation.

When the user grabs the electronic device with the left hand, the processor 210 determines that input is received in a first user input area and displays the edge screen in the left edge screen area 502. When the user grabs the electronic device with the right hand, the processor 210 determines that input is received in a second user input area and displays the edge screen in the right edge screen area 603. Thus, the user can easily touch the edge screen using the thumb of the left or right hand grabbing the electronic device. For example, the touch can include both of the contacting touch and the hovering touch.

After allocating the first or third area the edge screen area and the second area the main screen area, when detecting a touch in the main screen area and the edge screen area simultaneously or individually within a certain time, the processor 210 can ignore the touch detected in the edge screen area and thus prevent an unnecessary touch error.

For example, when the user holding the electronic device touches or hovers over the main screen with the thumb, the processor 210 can ignore the unnecessary touch on the edge screen. Further, when touching the main screen area and the edge screen area simultaneously or individually within a certain time is repeated for a preset time (e.g., three times at one second), the processor 210 can temporarily hide the edge screen if it is displayed in the edge display area or refrain from displaying the edge screen.

The processor 210 designates the opposite edge screen area of the left edge screen area 502 or the right edge screen area 603 as the inactive area, and displays the inactive screen 503 and 602 in the inactive area. The processor 210 excludes the touch on the inactive screen 503 and 502 from the user input, thus preventing an unnecessary user touch error.

The processor 210 can confirm a touch shape on the inactive screen 503 and 602 displayed in the inactive area, and thus determine whether the user hand holding the electronic device changes. For example, when the user holds the electronic device with the left hand, the left edge screen area displays the edge screen and the right edge screen area displays the inactive screen. In such instances, since the user's fingers touch the inactive screen, the processor 210 senses point-shaped touches corresponding to the finger touch.

Next, when the user grabs the electronic device by changing from the left hand to the right hand, a user's palm (e.g., a palm portion of the thumb of the right hand) of a wide range contacts the right edge screen area where the point-shaped touches were sensed and accordingly a palm-shaped touch corresponding to the palm is detected. Hence, the processor 210 can accurately determine whether the user hand holding the electronic device changes based on the touch shape in the right or left edge screen area which is designated as the inactive area.

Figure 7:
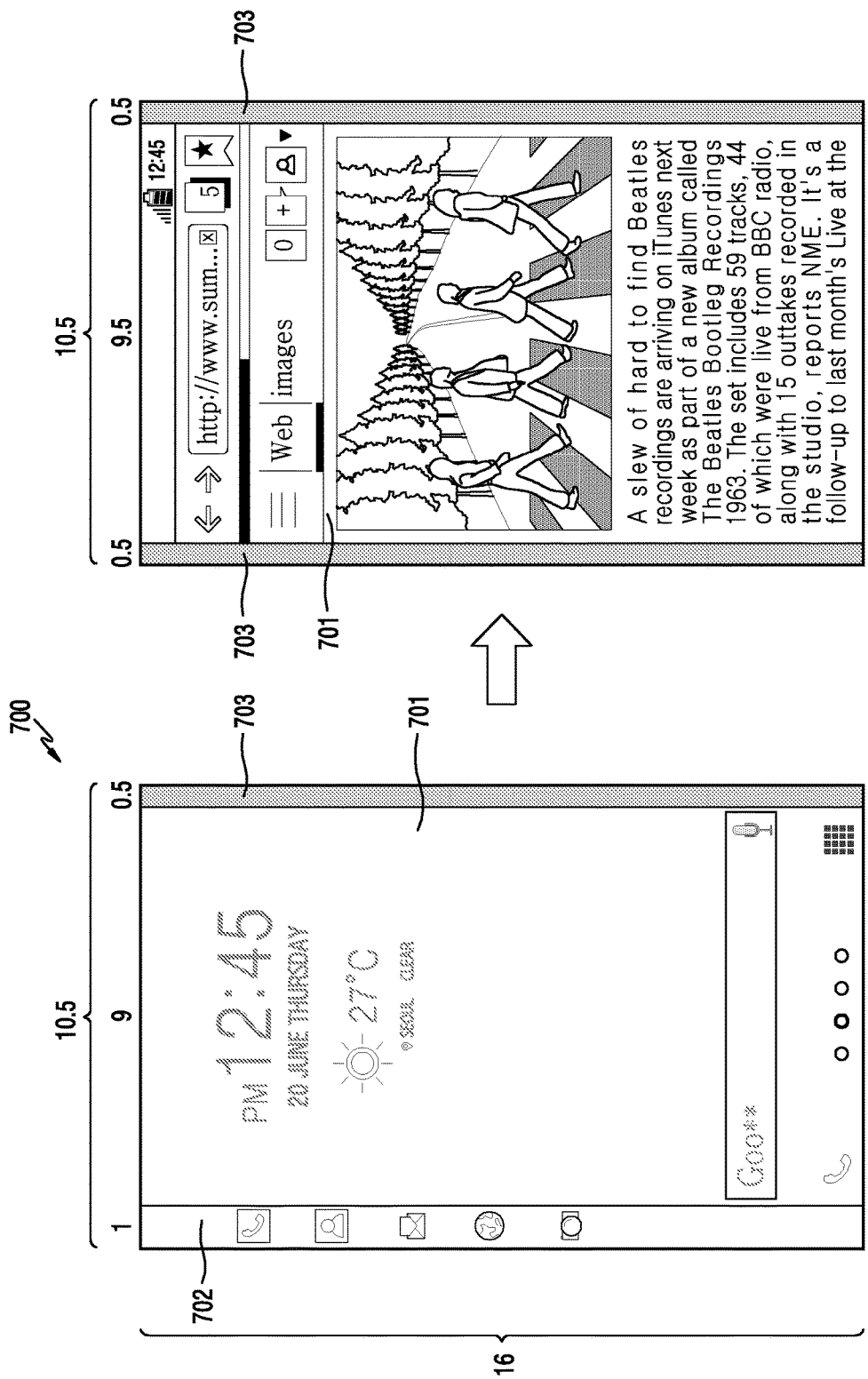
FIG. 7 is a diagram of an example of a user interface, according to an embodiment of the present disclosure.
Figure 8:
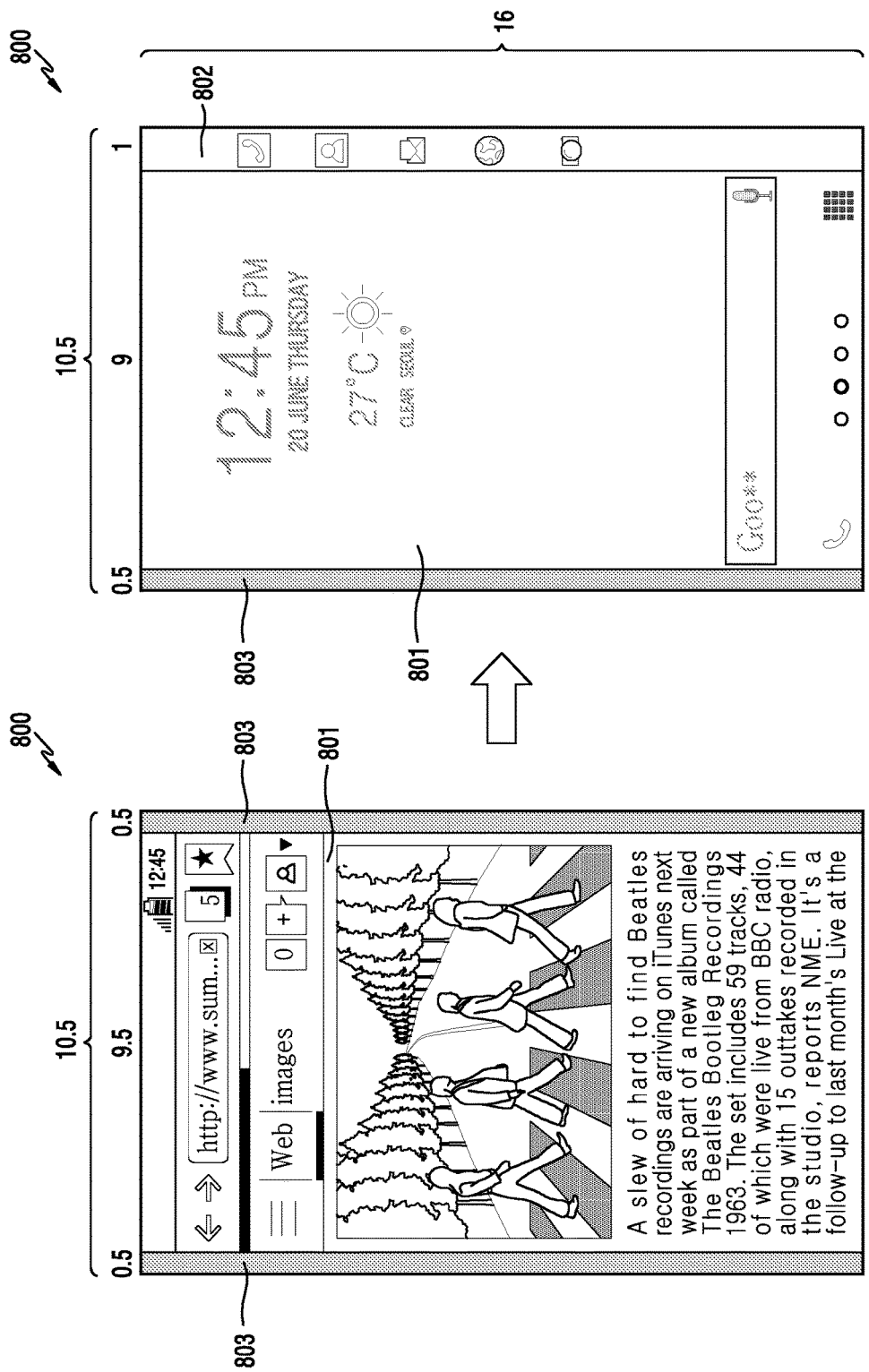
FIG. 8 is a diagram of an example of a user interface, according to an embodiment of the present disclosure.

FIGS. 7-8 are diagrams illustrating examples of user interfaces, according to various embodiments of the present disclosure. More particularly, FIG. 7 depicts an application execution screen displayed on an electronic device 700 and FIG. 8 depicts a home screen displayed on an electronic device 800.

Referring to FIG. 7, when the user grabs the electronic device 700 with the user's left hand, the processor 210 of the electronic device 700 can determine that input is received in a first user input area, divide the display area into a left edge screen area 702, a main screen area 701, and a right edge screen area 703, and designate the right edge screen area 703 as the inactive area. Next, when executing a particular application according to a user request, the processor 210 can display the application execution screen in the main screen area 701.

As shown in FIG. 7, when displaying the application execution screen, the processor 210 can magnify the main screen area 701 and display the first and second inactive screen 703 on both sides of the main screen area 701.

For example, the left edge screen area 703 displaying the first inactive screen, the main screen area 701, and the right edge screen area 705 displaying the second inactive screen can be displayed in a ratio of 0.5:9.5:0.5. Thus, the left screen area and the right screen area may be inactive when they are the same size.

Referring to FIG. 8, when displaying the application execution screen in the main screen area 801 and switching from the application execution screen to the home screen according to a user request, the processor 210 of the electronic device 800 can change the status of the first user input area or the second user input area based on which hand the user is holding the electronic device 800 with.

For example, when returning to the home screen, the processor 210 compares touch detection values of the inactive screen 803 displayed in the left edge screen area and the right edge screen area. When detecting a palm-shaped touch in the left edge screen area, the processor 210 can activate the left edge screen area. When detecting a palm-shaped touch in the right edge screen area, the processor 210 can activate the right edge screen area.

When activating the right edge screen area, the processor 210 can divide the display area of the electronic device 800 to the left edge screen area 803, the main screen area 801, and the right edge screen area 802, and designate the left edge screen area 803 as the inactive area as shown in FIG. 8.

Figure 9:
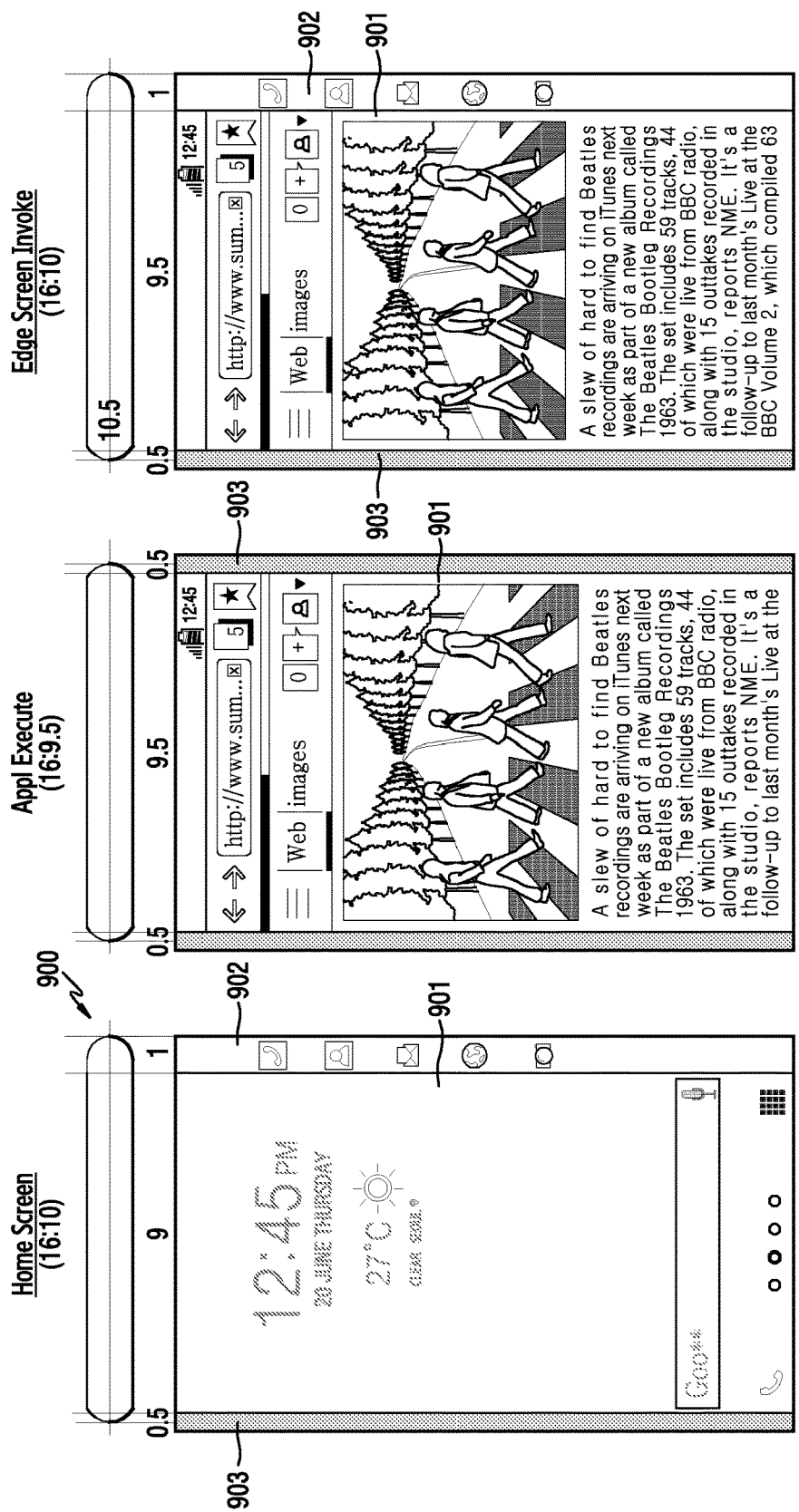
FIG. 9 is a diagram of an example of a user interface, according to an embodiment of the present disclosure.
Figure 10:
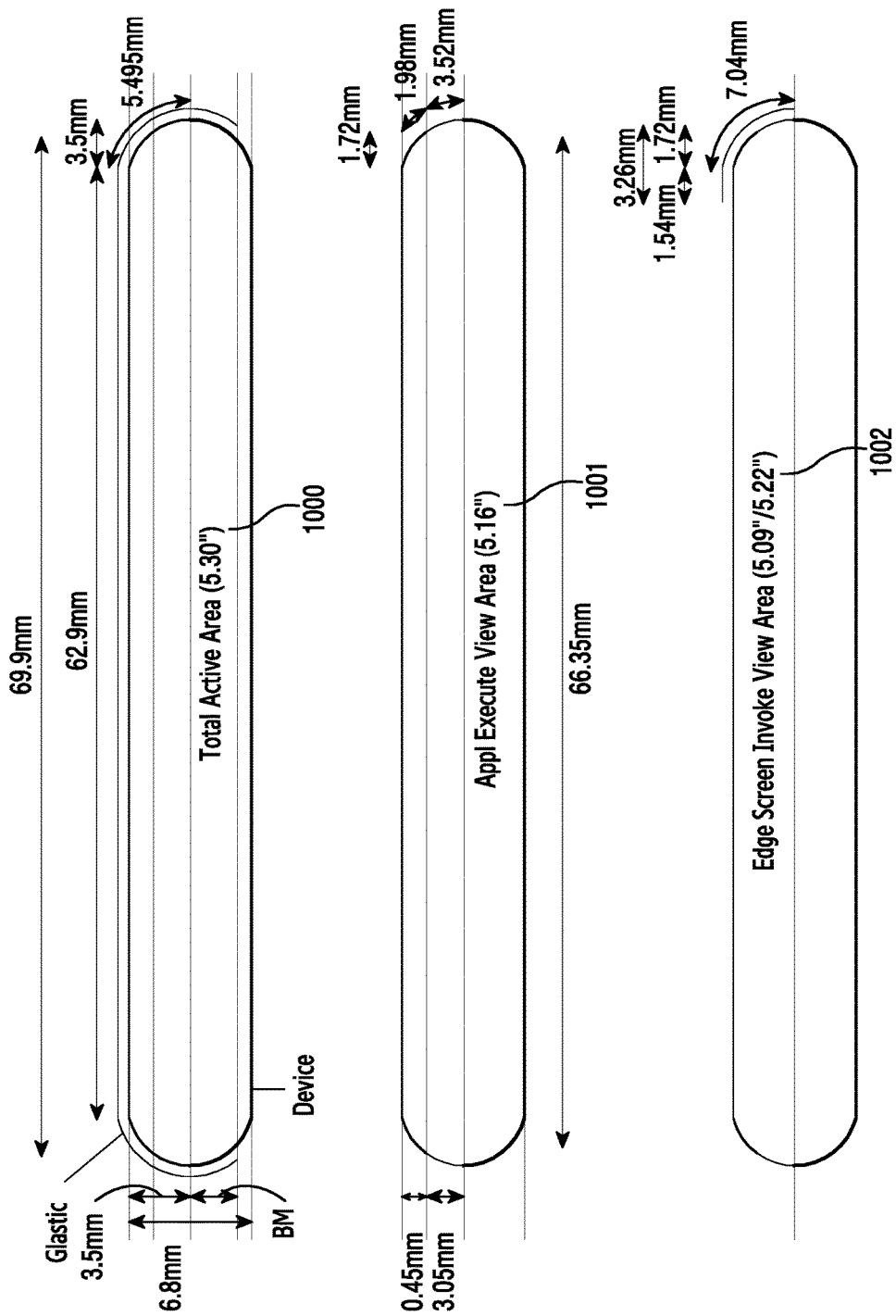
FIG. 10 is a diagram illustrating an example of display area division in an electronic device, according to an embodiment of the present disclosure.

FIG. 9 is a diagram of an example of a user interface, according to an embodiment of the present disclosure. More particularly, FIG. 9 depicts an edge screen invoked and displayed on an electronic device 900 according to an embodiment of the present disclosure. FIG. 10 depicts display area division in an electronic device according to an embodiment of the present disclosure.

Referring to FIG. 9, when switching from a home screen display mode to an application execution screen display mode, the processor 210 of the electronic device 900 can display the application execution screen in a main screen area 901, display an inactive screen 903 in left and right edge screen areas on both sides of the main screen area 901, and invoke and display an edge screen according to a user request. In this case, the processor 210 can re-divide the display based on which hand the user is holding the electronic device 900 with.

For example, when display of the edge screen is requested, the processor 210 compares touch detection values of the inactive screen 903 displayed in the left and right edge screen areas on both sides of the main screen area. When detecting a palm-shaped touch in the left edge screen area, the processor 210 can activate the left edge screen area. When detecting a palm-shaped touch in the right edge screen area, the processor 210 can activate the right edge screen area.

When activating the right edge screen area, the processor 210 can divide the display area of the electronic device 900 to a left edge screen area 903, a main screen area 901, and a right edge screen area 902, and designate the left edge screen area 903 as the inactive area as shown in FIG. 9.

FIG. 10 is a diagram illustrating an example of display area division in an electronic device, according to an embodiment of the present disclosure. As illustrated in FIG. 10, a display area of the electronic device can be variously switched to a total active view area 1000, an application view area 1001, and an edge screen invoke view area 1002. The areas 1000, 1001, and 1002 can have different sizes.

A method for controlling a display of an electronic device can include determining a user input area detected in the electronic device; and dividing a display area of the electronic device to at least three areas according to the user input area.

Determining the user input area can determine whether the user input area is a first user input area or a second user input area, based on one or more of a contacting touch location, a hovering touch location, and a pressure location which are detected by one or more of a touch screen panel and a pressure sensor of the electronic device.

Splitting the display area can divide the display area of the electronic device to at least first, second, and third areas from the left. The display area can divide in a size of the third area<the first area<the second area according to the user input area, the first area can be designated as an active area, the second area can be allocated a main screen area, and the third area can be designated as inactive area. The display area can be divide in a size of the first area<the third area<the second area according to the user input area, the first area can be designated as an inactive area, the second area can be allocated a main screen area, and the third area can be designated as an active area.

The method can further include re-dividing the display area of the electronic device according to particular key inputting or particular gesture detection, which is preset.

The method can further include, when displaying an application execution screen, designating the first area and the third area as an inactive area and the second area as a main screen area. The first area and the third area divide as the inactive area can be in the same size.

The method can further include, when switching from the application execution screen to a home screen, re-determining a user input area (e.g., an area where user input is received) detected in the electronic device.

When switching to the home screen, re-determining the user input area can compare touch detection values detected in the first area and the third area designated as the inactive area, and determine whether the user input area is a first user input area or a second user input area.

The user input area can be determined as the first user input area when a palm-shaped touch of the touch detection values is detected in the first area, and the user input area can be determined as the second user input area when the palm-shaped touch is detected in the second area.

The method can further include, when dividing the first area or the third area as an edge screen area and the second area as a main screen area and detecting touches in the main screen area and the edge screen area at the same time or within a certain time, ignoring the touch detected in the edge screen area.

An electronic device can include a display; a touch screen panel; and a processor for associating with the display and the touch screen module. The processor can determine a user input area detected in the touch screen panel and divide a display area of the display to at least three areas according to the user input area.

The processor can determine whether the user input area is a first user input area or a second user input area, based on one or more of a contacting touch location, a hovering touch location, and a pressure location which are detected by one or more of a pressure sensor and the touch screen panel.

The processor can divide the display area of the display to at least first, second, and third areas from the left. The display area can be divide in a size of the third area<the first area<the second area according to the user input area, the first area can be designated as an active area, the second area can be allocated a main screen area, and the third area can be designated as an inactive area. The display area can be divide in a size of the first area<the third area<the second area according to the user input area, the first area can be designated inactive area, the second area can be allocated a main screen area, and the third area can be designated as an active area.

The processor can re-divide the display area of the electronic device according to particular key inputting or particular gesture detection, which is preset.

In association with the display, when displaying an application execution screen, the processor can designate the first area and the third area as inactive areas and the second area as a main screen area. The first area and the third area can be in the same size when they are both inactive.

When switching from the application execution screen to a home screen, the processor can compare touch detection values detected in the first area and the third area designated as the inactive area, and re-determine whether the user input area is a first user input area or a second user input area.

The processor can determine the user input area as the first user input area when a palm-shaped touch of the touch detection values is detected in the first area, and determine the user input area as the second user input area when the palm-shaped touch is detected in the second area.

When dividing the first area or the third area as an edge screen area and the second area as a main screen area and detecting touches in the main screen area and the edge screen area at the same time or within a certain time, the processor can ignore the touch detected in the edge screen area.

As set forth above, the user can easily touch the edge screen displayed on one side of the electronic device using both of the left hand and the right hand. Therefore, an unnecessary touch error can be prevented by designating the opposite area of the edge screen display area as the inactive area.

Further, the main screen area displaying the application execution screen can be efficiently magnified and displayed, and an unnecessary touch error can be prevented by designating both areas of the main screen area as the inactive area.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

FIGS. 1-10 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
  a display;
  a memory; and
  at least one processor operatively coupled to the memory, configured to:
  detect a first input inputted by a user's hand gripping the electronic device;
  identify an area in which the first input is detected on the display including a main screen area, a left-edge area, and a right-edge area;
  when the area corresponds to the left-edge area, set the right-edge area as an inactive area such that any touch inputs to the right-edge area are ignored; and
  when the area corresponds to the right-edge area, set the left-edge area as an inactive area such that any touch inputs to the left-edge area are ignored,
  wherein the at least one processor is further configured to:
  when an application execution screen is displayed:
  set the left-edge area and the right-edge area as inactive areas;

remove graphical elements which have been displayed in at least one of the left-edge area or the right-edge area; and in response to the electronic device being switched from displaying an application execution screen to displaying a home screen:

detect a second input inputted by the user's hand gripping the electronic device;

identify an area in which the second input is detected on the display;

when the area in which the second input is detected corresponds to the left-edge area of the display, set the right-edge area as an inactive area; and when the area in which the second input is detected corresponds to the right-edge area of the display, set the left-edge area as an inactive area.

2. The electronic device of claim 1, wherein the main screen area is adjacent to the left-edge area and the right-edge area, wherein the main screen area includes a flat surface of the display, wherein each of the left-edge area and the right-edge area includes a curved surface of the display, wherein when an input is detected within the inactive area, no action is executed by the electronic device in response to the input, and wherein setting the left-edge or right-edge area of the display as the inactive area further includes displaying an indication within the inactive area, indicating that the inactive area is disabled.

3. The electronic device of claim 1, wherein the at least one processor is further configured to set the left-edge area and the main screen area as active areas, and wherein the right-edge area is allocated to be smaller than the left-edge area.

4. The electronic device of claim 1, wherein the at least one processor is further configured to set the right-edge area and the main screen area as active areas, wherein the left-edge area is allocated to be smaller than the right-edge area.

5. The electronic device of claim 1, wherein when the left-edge area and the right-edge area as the inactive areas are set, the left-edge area and the right-edge area are allocated to be have same sizes.

6. The electronic device of claim 1, wherein the at least one processor is further configured to:

detect a third input for displaying graphical elements in the left-edge area or the right-edge area; and in response to detecting the third input, control the display to display the graphical elements in an area which is set as an active area between the left-edge area and the right-edge area.

7. The electronic device of claim 6, wherein the at least one processor is further configured to:

detect a fourth input which is inputted in the main screen area and a fifth input which is inputted in one of the left-edge area and the right-edge area, and ignore the fifth input in response to the fourth input and the fifth input being detected at a same time or within a predetermined time period.

8. A method for controlling a display of an electronic device, comprising:

detecting a first input inputted by a user's hand gripping the electronic device;

identifying an area in which the first input is detected on the display including a main screen area, a left-edge area, and a right-edge area;

when the area corresponds to the left-edge area, setting the right-edge area as an inactive area such that any touch inputs to the right-edge area are ignored; and when the area corresponds to the right-edge area, setting the left-edge area as the inactive area such that any touch inputs to the left-edge area are ignored, wherein the method further comprises:

when an application execution screen is displayed:

setting the left-edge area and the right-edge area as inactive areas;

removing graphical elements which have been displayed in at least one of the left-edge area or the right-edge area; and in response to the electronic device being switched from displaying the application execution screen to displaying a home screen:

detecting a second input inputted by the user's hand gripping the electronic device;

identifying an area in which the second input is detected on the display;

when the area in which the second input is detected corresponds to the left-edge area of the display, setting the right-edge area as an inactive area; and when the area in which the second input is detected corresponds to the right-edge area of the display, setting the left-edge area as an inactive area.

9. The method of claim 8, wherein the main screen area is adjacent to the left-edge area and the right-edge area, wherein the main screen area includes a flat surface of the display, wherein each of the left-edge area and the right-edge area includes a curved surface of the display, wherein when an input is detected within the inactive area, no action is executed in response to the input, and wherein setting the left-edge or right-edge area of the display as the inactive area further includes displaying an indication within the inactive area, indicating that the inactive area is disabled.

10. The method of claim 8, wherein the setting the right-edge area as the inactive area further comprises setting the left-edge area and the main screen area as active areas, and wherein the right-edge area is allocated to be smaller than the left-edge area.

11. The method of claim 8, wherein the setting the left-edge area as the inactive area further comprises setting the right-edge area and the main screen area as active areas, and wherein the left-edge area is allocated to be smaller than the right-edge area.

12. The method of claim 8, wherein when the left-edge area and the right-edge area as the inactive areas are set, the left-edge area and the right-edge area are allocated to be have same sizes.

13. The method of claim 8, further comprising:

detecting a third input for displaying graphical elements in the left-edge area or the right-edge area; and in response to detecting the third input, displaying the graphical elements in an area which is set as an active area between the left-edge area and the right-edge area.

14. The method of claim 13, further comprising:

detecting a fourth input which is inputted in the main screen area and a fifth input which is inputted in one of the left-edge area and the right-edge area; and ignoring the fifth input in response to the fourth input and the fifth input being detected at a same time or within a predetermined time period.

15. The method of claim 8, wherein the identifying the area comprises:

detecting a palm touch in one of the left-edge area and the right-edge area; and identifying the area, based on an area in which the palm touch is detected.

16. A non-transitory computer-readable storage medium storing one or more processor-executable instructions which when executed by at least one processor cause the at least one processor to perform a method comprising the steps of:

detecting a first input inputted by a user's hand gripping an electronic device;

identifying an area in which the first input is detected on a display including a main screen area, a left-edge area, and a right-edge area;

when the area corresponds to the left-edge area, setting the right-edge area as an inactive area such that any touch inputs to the right-edge area are ignored; and when the area corresponds to the right-edge area, setting the left-edge area as the inactive area such that any touch inputs to the left-edge area are ignored, wherein the method further comprises:

when an application execution screen is displayed:

setting the left-edge area and the right-edge area as inactive areas;

removing graphical elements which have been displayed in at least one of the left-edge area or the right-edge area; and in response to the electronic device being switched from displaying the application execution screen to displaying a home screen:

detecting a second input inputted by the user's hand gripping the electronic device;

identifying an area in which the second input is detected on the display;

when the area in which the second input is detected corresponds to the left-edge area of the display, setting the right-edge area as an inactive area; and when the area in which the second input is detected corresponds to the right-edge area of the display, setting the left-edge area as an inactive area.

\* \* \* \* \*